United States Patent [19]

Blanchart et al.

[11] Patent Number: 4,696,872

[45] Date of Patent: Sep. 29, 1987

[54] PROCESS FOR PRODUCING A CATALYTIC LAYER FOR A FUEL CELL ELECTRODE

[75] Inventors: Alain P. O. Blanchart, Balen; Christian J. E. C. Van Der Poorten, Turnhout, both of Belgium

[73] Assignee: Electrochemische Energieconversie N.V. (Elenco N.V.), Mol, Belgium

[21] Appl. No.: 903,221

[22] Filed: Sep. 3, 1986

[30] Foreign Application Priority Data

Sep. 5, 1985 [NL] Netherlands ............... 8502435

[51] Int. Cl.$^4$ ............... H01M 4/88; H01M 4/96
[52] U.S. Cl. ............... 429/42; 502/101
[58] Field of Search ............... 429/42; 502/101

[56] References Cited

U.S. PATENT DOCUMENTS

| 3,425,875 | 2/1969 | Adlhart | 502/101 |
| 4,447,505 | 5/1984 | Blanchart | 429/42 |

FOREIGN PATENT DOCUMENTS

| 0082514 | 6/1983 | Japan | 502/101 |
| 0165254 | 9/1983 | Japan | 429/42 |
| 0133659 | 7/1985 | Japan | 502/101 |

*Primary Examiner*—Donald L. Walton
*Attorney, Agent, or Firm*—Cushman, Darby & Cushman

[57] ABSTRACT

Present invention relates to a process for producing a catalytic layer for a fuel cell electrode, which process is characterized in that first step at least two carbons or mixtures of carbons are separately mixed with binder, subsequently in a second step these separate carbon/binder mixtures are intimately mixed together and after that in a third step the mixture obtained is formed into a catalytic layer of the desired dimensions.

15 Claims, No Drawings

PROCESS FOR PRODUCING A CATALYTIC LAYER FOR A FUEL CELL ELECTRODE

The invention relates to a process for producing a catalytic layer for a fuel cell electrode, which layer contains at least two carbons, at least one carbon of which contains noble metal. Said noble metal may occur on the surface of the carbon and/or in the pores of the carbon.

Such a process is known, for instance, from the U.S. Pat. No. 4,447,505. According to that patent specification such a process is characterized in that a carbon with a relatively low specific surface, lower than 100 $m^2 g^{-1}$, provided with 1–10% (wt) noble metal, for instance Pt, is intimately mixed, in a weight ratio between 10:1 and 1:10, with a carbon with a relatively high specific surface, higher than 150 $m^2 g^{-1}$, provided with 0–10% (wt) noble metal, for instance Pt, and this mixture of two carbons is subsequently mixed with a binding agent, for instance 3–30 parts by weight polytetrafluoroethylene (PTFE) per 100 parts by weight carbon and is then formed into a catalytic layer of the desired dimensions.

The process according to the state of the art provides catalytic layers for fuel cell electrodes, which electrodes combine the ability of providing a good cell performance with a good stability, i.e. the ability to provide a high initial cell performance decreasing only very slowly with the passage of time.

The object of the invention is a process for producing a catalytic layer for a fuel cell electrode, which electrode shows a substantially improved combination of stability and cell performance compared with an electrode provided with a catalytic layer produced according to the known process. The process according to the invention is characterized in that in a first step at least two carbons or mixtures of carbons are separately mixed with binder, subsequently in a second step these separate carbon/binder mixtures are intimately mixed together and after that in a third step the mixture obtained is formed into a catalytic layer of the desired dimensions.

Highly suitable carbons or mixtures of carbons for the process according to the invention are carbons or mixtures of carbons with a relatively low specific surface, lower than 100 m2 $g^{-1}$, preferably lower than 50 $m^2 g^{-1}$, provided with 1–10% (wt) noble metal, preferable Pt, in addition to carbons or mixtures of carbons with a relatively high specific surface, higher than 150 $m^2 g^{-1}$, preferably between 200 and 1200 $m^2 g^{-1}$, specifically between 250 and 500 $m^2 g^{-1}$, provided with 0–10% (wt) noble metal, preferably Pt, the percentage by weight of noble metal on the carbon or mixture of carbons with a relatively low specific surface being higher than or equal to the percentage by weight of noble metal on the carbon or mixture of carbons with a relatively high specific surface.

Highly suitable carbons with a specific surface lower than 100 $m^2 g^{-1}$ for electrodes according to the invention are graphite, graphitized carbon, low-surface carbon black and specifically etched graphite. This last-mentioned carbon can be conveniently prepared by contacting graphite, before applying noble metal to it, with substances such as a peroxide, fluorine or chlorine.

Suitable carbons with a specific surface higher than 150 $m^2 g^{-1}$ for electrodes according to the invention are high-surface carbon black and activated carbon, especially carbon subjected to thermal treatment.

A noble metal for electrodes according to the invention may be, for instance, ruthenium, palladium, silver or platinum. A highly suitable noble metal for electrodes according to the invention is platinum. A suitable manner of providing carbon with noble metal is to precipitate one or more salts of the desired noble metal from a solution onto this carbon and to subsequently reduce these salts to pure metal, using hydrogen.

When using the above-mentioned carbons and/or mixtures of carbons, the process is preferably carried out in such a manner that the weight ratio between the carbon or mixture of carbons with a relatively low specific surface and the carbon or mixture of carbons with a relatively high specific surface in prepared catalytic layers is between 10:1 and 1:10.

In the process accoding to the invention the binding agent is preferably polytetrafluoroethylene (PTFE), polytrifluorochloroethylene (PTFCE), a polyolefin, for instance polypropylene, high-density polyethylene or polyisobutene, or an epoxy resin, special preference being given to PTFE, preferably in an amount of 3–50 parts by weight per 100 parts by weight carbon, specifically in an amount of 3–30 parts by weight per 100 parts by weight carbon, specifically in an amount of 3–30 parts by weight per 100 parts by weight carbon.

For every carbon or every mixture of carbons mixed separately with binding agent the most suitable binder an be chosen in an optimum amount. This constitutes a major advantage of the process according to the invention over the known process.

According to a suitable mode of realizing the process according to the invention at least two carbons or mixtures of carbons in the form of a fine powder are started from. Every carbon powder is then mixed with an optional amount of an optional powdery binding agent, preferably in a so-called Henschel mixer. The dry mixture is subsequently subjected to an agglomeration step and the resulting agglomerates are crushed. Thus at least two mixtures of carbon and binding agent are obtained consisting of crushed agglomerates. These carbon/binder mixtures are subsequently mixed together, the whole is pressed together and finally the compressed mass is rolled out, preferably in various steps, to form a catalytic layer of the desired thickness. For details of the mixing of a carbon or a mixture of carbons with binder in dry condition, the agglomeration, the crushing of agglomerates and the rolling out of crushed and subsequently compressed agglomerates referenc is made here to the U.S. Pat. No. 4,383,010. In the manufacture of one or more of the carbon/binder mixtures, it is quite possible to start from a suspension of a binder in a liquid and from a powdery carbon or a powdery mixture of carbons, to mix the suspension and the carbon powder, to dry the mixture and subsequently to agglomerate it and to process it further in the manner described above.

In a suitable variant to this mode of realization the various agglomerates of the various carbon/binder mixtures are mixed together already before the crushing.

The invention also relates to a catalytic layer for a fuel cell electrode comprising 1–1000 parts by weight of a carbon of a mixture of carbons A provided with 3–50 parts by weight of a binder X per 100 parts by weight A in addition to 1–1000 parts by weight of a carbon or a mixture of carbons B provided with 3–50 parts by weight of a binder Y per 100 parts by weight B. The catalytic layer preferably contains, per 100 parts by weight carbon, 3–30 parts by weight binder.

Carbons or mixture of carbons of A and carbon or mixture of carbons B are mostly not the same. The distinction between A and B may consist, though, in just a difference in the noble metal content of otherwise the same carbons or mixtures of carbons. Carbon destined for carbon or mixture of carbons A is chosen preferably from the above carbons with a relatively low specific surface, and carbon destined for carbon or mixture of carbons B is preferably chosen from the above carbons with a relatively high specific surface. The weight ratios between carbon or mixture of carbons A and carbon or mixture of carbons B are preferably as described above, which also applies to the percentages by weight of noble metal on the various carbons or mixtures of carbons.

Binder X and binder Y must be different in case carbon or mixture of carbons A and carbon or mixture of carbons B are the ame. In that case the distinction between carbon or mixture of carbons A with binder X and carbon or mixture of carbons B with binder Y just consists in the difference in binder. In the other cases binders X and Y may be the same or different.

The preference regarding the binders is the same as the above-mentioned preference for binders in the process according to the invention. In addition to the said carbons and mixtures of carbons A and B and binders X and Y, a catalytic layer according to the invention may yet contain other substances, for instance other carbons and/or binders.

The invention is further elucidated by means of the following examples and the comparative experiment. In these examples and in the comparative example the electrode performance is measured in an H$_2$/ KOH (concentration 6 moles per liter)/air cell with an active surface of 289 cm$^2$ at an electrolyte temperature of 338 K and a permanent voltage of 0.69 V, with always the same hydrogen anodes, the air cathode, which is otherwise the same, always containing a different catalytic layer, which catalytic layer always does have the same thickness of 100 μm.

In the examples and in the comparative experiment the following substances are used:
Carbon 1: Graphite with a specific surface of 12 m$^2$g$^{-1}$ provided with 5% (wt) Pt.
Carbon 2: Activated carbon the specific surface of which has been reduced by means of a thermal treatment from 850 to 300 m$^2$ g$^{-1}$ without Pt.
PTFE 1: Teflon K grade 10 N ®, a trade product of the firm of DuPont consisting of a PTFE powder having an average particle size of 500 μm.
PTFE 2: Teflon K grade 10 N ®, a trade product of the firm of DuPont consisting of an aqueous suspension of PTFE particles with a particle size between about 0.05 and 0.5 μm (1 g PTFE 2 is hereinafter meant to be 1 g pure PTFE, the amount of water and any other components of the suspension not being included).

In these examples and in the comparative experiment the dry mixing of carbon and binder, the agglomeration, crushing and screening of the agglomerate, the pressing and the rolling out into the catalytic layer and the composition to form fuel cell electrodes together with the other required layers of this fuel cell electrode are carried out as described in the example of the U.S. Pat. No. 4,383,010.

EXAMPLE I 60 g Carbon 1 is mixed with 8.75 g PTFE 1 and subsequently agglomerated, crushed and screened. In addition 25 g carbon 2 is mixed with 6.25 g PTFE 1 and subsequently agglomerated, crushed and screened.

The two carbon/binder mixtures thus obtained are intimately mixed with each other using a coffee grinder. The resulting powder is subsequently pressed and rolled and finally rolled, together with other layers, to form air electrode I, which air electrode I is tested in the manner mentioned above. The test results are shown in the table.

COMPARATIVE EXAMPLE A 60 g Carbon 1 is intimately mixed with 25 g Carbon 2. The resulting carbons mixture is subsequently mixed with 15 g PTFE 1 and subsequently agglomerated, crushed, screened, pressed, rolled and finally rolled, together with other layers to form air electrode A, which air electrode A is tested in the manner mentioned above. The test results are shown in the table.

EXAMPLE II 60 g Carbon 1 is mixed with 8.75 g PTFE 1 and subsequently agglomerated, crushed and screened. In addition 25 g Carbon 2 is mixed with 3 g PTFE 2 (in aqueous suspension). This mixture is subsequently filtered and dried at 383 K. Subsequently the dried mixture is agglomerated, crushed and screened. The two resulting carbon/binder mixtures are intimately mixed with each other using a coffee grinder. The resulting powder is subsequently pressed and rolled and finally rolled, together with other layers, to form air electrode II, which air electrode II was tested in the manner mentioned above. The test results are shown in the table.

TABLE

| Air electrode | PTFE grades applied | composition active layer in pts/wt | current density in mA.cm$^{-2}$ | duration since beginning of test in hours |
|---|---|---|---|---|
| I | 1 + 1 | Carbon 1: 60 | 110 | 0 |
| | | Carbon 2: 25 | 108 | 1000 |
| | | PTFE 1: 15 | 105 | 2500 |
| | | | 102 | 5000 |
| A | 1 + 1 | Carbon 1: 60 | 108 | 0 |
| | | Carbon 2: 25 | 100 | 1000 |
| | | PTFE 1: 15 | 97 | 2500 |
| | | | 94 | 5000 |
| II | 1 + 2 | Carbon 1: 60 | 127 | 0 |
| | | Carbon 2: 25 | 126 | 1000 |
| | | PTFE 1: 8,75 | 124 | 2500 |
| | | PTFE 2: 15 | 121 | 5000 |

We claim:
1. Process for producing a catalytic layer for a fuel cell electrode, characterized in that in a first step at least two carbons or mixtures of carbons are separately mixed with binder, subsequently in a second step these separate carbon/binder mixtures are intimately mixed together and after that in a third step the mixture obtained is formed into a catalytic layer of the desired dimensions.

2. Process according to claim 1, characterized in that in the first step carbon or a mixture of carbons with a relatively low specific surface, lower than 100 m$^2$ g$^{-1}$, provided with 1–10% (wt) noble metal, is mixed with a binder and in addition a cabon or a mixture of carbons with a relatively high specific surface, higher than 150 m$^2$ g$^{-1}$, provided with 0–10% (wt) noble metal, is mixed with a binder, the percentage by weight of noble metal on the carbon or mixture of carbons with a relatively low specific surface being higher than or equal to the percentage by weight of noble metal on the carbon or mixture of carbons with a relatively high specific surface.

3. Process according to claim 1 characterized in that the carbon or mixture of carbons with a relatively low specific surface has a specific surface lower than 50 $m^2 g^{-1}$.

4. Process according to claim 1, characterized in that the carbon or mixture of carbons with a relatively high specific surface has a specific surface between 200 and 1200 $m^2 g^{-1}$.

5. Process according to claim 4, characterized in that the carbon or mixture of carbons with a relatively high specific surface has a specific surface between 250 and 500 $m^2 g^{-1}$.

6. Process according to claim 1, characterized in that the carbon or the whole or a part of the mixture of carbons with a relatively high specific surface has been subjected to thermal treatment.

7. Process according to claim 1, characterized in that as carbon or as the whole or part of the mixture of carbons with a relatively low specific surface graphite is used.

8. Process according to claim 7, characterized in that at least a part of this graphite has been etched.

9. Process according to claim 1, characterized in that as carbon or as the whole or part of the mixture of carbons with a relatively high specific surface activated carbon is used.

10. Process according to claim 1, characterized in that per 100 parts by weight carbon 3–50 parts by weight, specifically 3–30 parts by weight, binder is used.

11. Process according to claim 1, characterized in that the noble metal is Pt.

12. Process according to claim 1, characterized in that the binder is PTFE.

13. Process according to claim 2, characterized in that the weight ratio applied between the carbon or mixture of carbons with a relatively low specific surface and the carbon or mixture of carbons with a relatively high specific surface is between 10:1 and 1:10.

14. Fuel cell electrode, characterized in that this electrode contains a catalytic layer produced according to claim 1.

15. Fuel cell, characterized in that this cell contains at least one fuel cell electrode according to claim 14.

* * * * *